US012753094B2

(12) United States Patent
Fischmann

(10) Patent No.: US 12,753,094 B2
(45) Date of Patent: Oct. 6, 2026

(54) STRUCTURE AND APPARATUS FOR PURIFYING AND CONTAINING HIGH CLARITY WATER USED FOR DIRECT CONTACT RECREATIONAL PURPOSES

(71) Applicant: CRYSTAL LAGOONS TECHNOLOGIES, INC., Miami, FL (US)

(72) Inventor: Fernando Fischmann, Miami, FL (US)

(73) Assignee: CRYSTAL LAGOONS TECHNOLOGIES, INC., Miami, FL (US)

( * ) Notice: Subject to any disclaimer, the term of this patent is extended or adjusted under 35 U.S.C. 154(b) by 0 days.

(21) Appl. No.: 19/453,256

(22) Filed: Jan. 20, 2026

(65) Prior Publication Data

US 2026/0145965 A1 May 28, 2026

Related U.S. Application Data

(63) Continuation-in-part of application No. 18/810,239, filed on Aug. 20, 2024, which is a continuation of application No. 17/871,830, filed on Jul. 22, 2022, now Pat. No. 12,110,236.

(60) Provisional application No. 63/306,826, filed on Feb. 4, 2022.

(51) Int. Cl.
*C02F 1/00* (2023.01)
*C02F 103/42* (2006.01)

(52) U.S. Cl.
CPC .............. *C02F 1/004* (2013.01); *C02F 1/001* (2013.01); *C02F 2103/42* (2013.01); *C02F 2201/005* (2013.01); *C02F 2209/11* (2013.01); *C02F 2307/14* (2013.01)

(58) Field of Classification Search
None
See application file for complete search history.

(56) References Cited

U.S. PATENT DOCUMENTS

| | | | | | |
|---|---|---|---|---|---|
| 483,600 | A * | 10/1892 | Butler | A63K 1/00 | 119/422 |
| 1,657,598 | A * | 1/1928 | Whitman | E04H 3/16 | 4/494 |
| 2,071,520 | A * | 2/1937 | Harrison | E02B 3/068 | 405/107 |
| 3,596,996 | A * | 8/1971 | Carter | E02F 3/962 | 299/24 |

(Continued)

FOREIGN PATENT DOCUMENTS

WO 2021175795 10/2021

OTHER PUBLICATIONS

A pond, a swimming pool or their analogues in your summer cottage, garden plot; https://woodmaterial.ru/allsad/14.php; English machine translation of the text; date unknown; accessed Mar. 14, 2025; 23 pages.

(Continued)

*Primary Examiner* — Richard C Gurtowski
(74) *Attorney, Agent, or Firm* — MERCHANT & GOULD P.C.

(57) ABSTRACT

A low-cost structure is for the containment of high clarity water. The structure provides for the purification of water that is used for direct contact recreational purposes. The structure utilizes microleakage and a dual frequency skimmer system.

38 Claims, 8 Drawing Sheets

(56) References Cited

U.S. PATENT DOCUMENTS

| | | | | |
|---|---|---|---|---|
| 3,673,751 | A * | 7/1972 | Boassy | E04H 4/0012<br>52/741.12 |
| 3,695,434 | A * | 10/1972 | Whitten, Jr. | C02F 1/001<br>210/765 |
| 3,739,539 | A * | 6/1973 | Posnick | E04H 4/0043<br>52/169.8 |
| 3,823,690 | A * | 7/1974 | Rynberk | E04H 4/00<br>119/228 |
| 3,832,814 | A * | 9/1974 | Teschner | E04H 4/0081<br>52/432 |
| 3,990,250 | A * | 11/1976 | Howard | E02D 17/13<br>405/266 |
| 4,263,759 | A * | 4/1981 | Miller | E04H 4/00<br>52/169.7 |
| 4,342,125 | A * | 8/1982 | Hodge | E04H 4/12<br>137/430 |
| 4,686,799 | A * | 8/1987 | Kwake | E04H 3/10<br>52/6 |
| 4,843,658 | A * | 7/1989 | Hodak | E04H 4/0081<br>52/169.9 |
| 4,976,088 | A * | 12/1990 | Powers | E04H 4/0081<br>52/169.8 |
| 5,139,853 | A * | 8/1992 | Mathieson | E02D 31/00<br>428/131 |
| 5,143,623 | A * | 9/1992 | Kroll | E02B 3/023<br>210/705 |
| 5,800,272 | A * | 9/1998 | Pons | A63G 25/00<br>472/88 |
| 6,168,532 | B1 * | 1/2001 | McCaffrey | E01C 13/083<br>52/6 |
| 6,317,901 | B1 * | 11/2001 | Corpuel | E04H 4/00<br>4/488 |
| 6,764,139 | B1 * | 7/2004 | Wortman | E02F 9/2875<br>299/95 |
| 7,036,449 | B2 * | 5/2006 | Sutter | B63B 35/44<br>114/264 |
| 7,717,569 | B2 * | 5/2010 | Sokeila | G03B 21/26<br>353/69 |
| 7,820,055 | B2 * | 10/2010 | Fischmann Torres | C02F 1/56<br>210/764 |
| 8,062,514 | B2 * | 11/2011 | Fischmann Torres | C02F 1/56<br>210/167.16 |
| 8,070,942 | B2 * | 12/2011 | Fischmann Torres | C02F 1/56<br>210/167.16 |
| 8,347,556 | B2 * | 1/2013 | Stelmaszek | G06Q 99/00<br>104/53 |
| 8,454,838 | B2 * | 6/2013 | Fischmann | C02F 1/5281<br>210/764 |
| 8,465,651 | B2 * | 6/2013 | Fischmann | E04H 4/1281<br>210/753 |
| 8,518,269 | B2 * | 8/2013 | Fischmann | B01D 21/30<br>210/721 |
| 8,544,220 | B2 * | 10/2013 | Milani | E02B 3/16<br>52/741.12 |
| 8,555,557 | B2 * | 10/2013 | Hosking | H02S 40/38<br>52/80.1 |
| 8,753,520 | B1 * | 6/2014 | Fischmann | C02F 1/008<br>210/764 |
| 8,790,518 | B2 * | 7/2014 | Fischmann Torres | C02F 1/56<br>210/721 |
| 9,051,193 | B2 * | 6/2015 | Fischmann | B01D 21/30 |
| 9,062,471 | B2 * | 6/2015 | Fischmann | E04H 4/1281 |
| 9,080,342 | B2 * | 7/2015 | Fischmann | C02F 9/00 |
| 9,470,007 | B2 * | 10/2016 | Fischmann Torres | C02F 9/00 |
| 9,470,008 | B2 * | 10/2016 | Fischmann | C02F 1/008 |
| 9,708,822 | B2 * | 7/2017 | Fischmann Torres | C02F 1/56 |
| 9,920,498 | B2 * | 3/2018 | Fischmann | E02B 15/041 |
| 9,957,693 | B2 * | 5/2018 | Fischmann Torres | E02F 3/9293 |
| 10,072,430 | B2 * | 9/2018 | Nasibov | E04H 3/02 |
| 10,358,837 | B2 * | 7/2019 | Khamis | E04H 4/0093 |
| 10,428,542 | B1 * | 10/2019 | Jackson | E04H 4/0081 |
| 10,472,839 | B2 * | 11/2019 | Khamis | E04H 4/0018 |
| 10,486,074 | B2 * | 11/2019 | Fischmann | A63G 31/007 |
| 10,521,870 | B2 * | 12/2019 | Fischmann | G06Q 99/00 |
| 10,724,260 | B2 * | 7/2020 | Fischmann | E02D 17/00 |
| 10,982,400 | B2 * | 4/2021 | Rodriguez Larreta | A01K 61/20 |
| 10,994,215 | B2 * | 5/2021 | Fischmann | A63G 31/007 |
| 10,997,683 | B2 * | 5/2021 | Fischmann | G06Q 99/00 |
| 10,997,684 | B2 * | 5/2021 | Fischmann | G06Q 99/00 |
| 11,015,333 | B2 * | 5/2021 | Fischmann | E04H 3/22 |
| 11,098,495 | B2 * | 8/2021 | Fischmann | G06Q 10/04 |
| 11,123,645 | B2 * | 9/2021 | Fischmann | E02F 3/8858 |
| 11,132,663 | B2 * | 9/2021 | Fischmann | E04H 4/0006 |
| 11,167,218 | B2 * | 11/2021 | Fischmann | A63G 31/007 |
| 11,186,981 | B2 * | 11/2021 | Fischmann | E04B 1/342 |
| 11,250,533 | B2 * | 2/2022 | Fischmann | G06Q 99/00 |
| 11,270,400 | B2 * | 3/2022 | Fischmann | E04B 1/342 |
| 11,280,099 | B2 * | 3/2022 | Fischmann | A63K 1/00 |
| 11,669,929 | B2 * | 6/2023 | Fischmann | G06Q 99/00<br>705/500 |
| 11,732,493 | B2 * | 8/2023 | Fischmann | E04H 3/12<br>52/741.11 |
| 12,110,236 | B2 | 10/2024 | Fischmann | |
| 2001/0018370 | A1 * | 8/2001 | Arie | A63K 1/00<br>104/53 |
| 2003/0228195 | A1 * | 12/2003 | Mizutani | E04H 4/0012<br>4/488 |
| 2007/0181498 | A1 * | 8/2007 | Kaas | C02F 1/44<br>210/182 |
| 2007/0196173 | A1 * | 8/2007 | Shehan | E02B 17/025<br>405/13 |
| 2007/0248414 | A1 * | 10/2007 | Fratianni | E04H 4/00<br>405/53 |
| 2008/0021776 | A1 * | 1/2008 | Lochtefeld | G06Q 90/00<br>705/14.46 |
| 2008/0116142 | A1 * | 5/2008 | Fischmann Torres | C02F 1/56<br>210/722 |
| 2008/0127574 | A1 * | 6/2008 | Yi | E04H 6/10<br>381/78 |
| 2010/0146869 | A1 * | 6/2010 | Stelmaszek | G06Q 99/00<br>52/9 |
| 2011/0108490 | A1 * | 5/2011 | Fischmann Torres | C02F 9/00<br>210/241 |
| 2012/0024796 | A1 * | 2/2012 | Fischmann | E04H 4/1281<br>210/764 |
| 2012/0061967 | A1 * | 3/2012 | Chaganti | F03B 17/005<br>290/52 |
| 2012/0102874 | A1 * | 5/2012 | Milani | E02B 3/16<br>52/741.12 |
| 2012/0131861 | A1 * | 5/2012 | Hosking | E04B 7/163<br>52/302.1 |
| 2012/0255113 | A1 * | 10/2012 | Osterman | E04H 4/14<br>29/458 |
| 2012/0291193 | A1 * | 11/2012 | Panchal | E04H 4/1209<br>210/97 |
| 2013/0074254 | A1 * | 3/2013 | Payne | E04H 4/0006<br>4/491 |
| 2014/0228138 | A1 * | 8/2014 | Scott | A63C 19/00<br>472/92 |
| 2015/0125212 | A1 * | 5/2015 | Fischmann | E02B 15/06<br>405/63 |
| 2015/0166361 | A1 * | 6/2015 | Fischmann | C02F 1/008<br>210/732 |
| 2015/0240506 | A1 * | 8/2015 | Ruhmann | A47C 1/12<br>52/8 |
| 2016/0177586 | A1 * | 6/2016 | Nasibov | F24F 5/0071<br>52/169.2 |
| 2019/0136561 | A1 | 5/2019 | Khamis et al. | |
| 2019/0169867 | A1 * | 6/2019 | Khamis | E04H 4/0018 |
| 2019/0169870 | A1 * | 6/2019 | Khamis | E04H 4/0018 |
| 2019/0232180 | A1 * | 8/2019 | Fischmann | A63G 31/007 |
| 2019/0236744 | A1 * | 8/2019 | Fischmann | G06Q 99/00 |
| 2019/0284826 | A1 * | 9/2019 | Gu | E04H 4/1209 |
| 2019/0355083 | A1 * | 11/2019 | Fischmann | G06Q 99/00 |
| 2020/0023281 | A1 * | 1/2020 | Fischmann | E02F 3/8858 |
| 2020/0023282 | A1 * | 1/2020 | Fischmann | A63G 31/007 |
| 2020/0027186 | A1 * | 1/2020 | Fischmann | G06Q 99/00 |

(56) References Cited

U.S. PATENT DOCUMENTS

| | | | | |
|---|---|---|---|---|
| 2020/0032502 | A1* | 1/2020 | Fischmann | E04H 3/14 |
| 2020/0032503 | A1* | 1/2020 | Fischmann | E04H 17/00 |
| 2020/0047076 | A1* | 2/2020 | Fischmann | A63G 31/007 |
| 2020/0051057 | A1* | 2/2020 | Fischmann | G07F 17/0042 |
| 2020/0074577 | A1* | 3/2020 | Fischmann | A63G 31/007 |
| 2020/0074579 | A1* | 3/2020 | Fischmann | G06Q 99/00 |
| 2020/0208423 | A1* | 7/2020 | Fischmann | E04H 3/12 |
| 2020/0208424 | A1* | 7/2020 | Fischmann | A63G 31/007 |
| 2020/0208425 | A1* | 7/2020 | Fischmann | E04H 4/144 |
| 2020/0283979 | A1* | 9/2020 | Gomes De Oliveira | A63G 3/00 |
| 2022/0170281 | A1* | 6/2022 | Fischmann | E04H 3/02 |
| 2022/0178159 | A1* | 6/2022 | Casadio | E04H 4/0081 |
| 2022/0188960 | A1* | 6/2022 | Fischmann | C02F 1/004 |
| 2023/0047399 | A1* | 2/2023 | Fischmann | E04H 4/148 |
| 2023/0057876 | A1* | 2/2023 | Fischmann | E04H 4/1218 |
| 2023/0058612 | A1* | 2/2023 | Fischmann | E04H 4/1281 |
| 2024/0409438 | A1 | 12/2024 | Fischmann | |

OTHER PUBLICATIONS

What can be the drainage of water from the pool; https://dachadecor.ru/basseyni/kakim-mozhet-bit-sliv-vodi-iz-basseyna#i-3; English machine translation of the text; date unknown; accessed Mar. 14, 2025; 11 pages.

* cited by examiner

STRUCTURE AND APPARATUS FOR PURIFYING AND CONTAINING HIGH CLARITY WATER USED FOR DIRECT CONTACT RECREATIONAL PURPOSES

This application is a Continuation in Part of U.S. patent application Ser. No. 18/810,239 filed Aug. 20, 2024, which is a continuation of U.S. patent application Ser. No. 17/871,830, filed Jul. 22, 2022, now U.S. Pat. No. 12,110,236, which claims benefit of U.S. Provisional Ser. No. 63/306,826 filed Feb. 4, 2022 and which applications are incorporated herein by reference. To the extent appropriate, a claim of priority is made to the above disclosed applications.

FIELD OF THE INVENTION

The present invention relates to a physical structure that allows containing high clarity water and eliminating particles that produce turbidity and other contaminants in large water bodies for direct contact recreational purposes at lower cost than traditional swimming pools' structures and swimming pool filtration technology.

BACKGROUND OF THE INVENTION

The construction of water bodies used for direct contact recreational purposes, such as swimming pools, generally requires the use of a filtration system capable of filtering the complete water volume homogeneously about four times per day. Filtration systems for swimming pools having large volumes and covering large surfaces are highly complex and expensive.

This is why large swimming pools, of about at least 3,000 m2 around the world have become less common, not only due to the high construction costs associated to the pool structure itself and the cost of the large filtration system needed, but also because of the high operational costs related to the treatment of water and the filtration systems for such large water volumes, among other variables.

For example, when swimming pools reach a certain size and overall treatment volume, homogeneous filtration of their complete water volume becomes a difficult task. Although large filtration systems and equipment can be theoretically used to achieve the required filtration rates for such large swimming pools, the reality is that in addition to the filtration equipment and systems, the structure must comprise a large quantity of suitably distributed inlets and outlets and their corresponding complex piping network in order to achieve a truly homogeneous and efficient filtration and to avoid "dead zones". This highly complex piping network with large quantities of pipes, valves, inlets, and outlets, has very high associated costs, in addition to an important head loss within such pipes that cause loss of pressure and reduces water flow, which may impact the homogeneity of the dosing, circulation, and filtration. Such head loss is generally reversed with the use of high cost and large sized pumps that have high energy consumption.

Further, inlets have a limited range of how far they can push water out, especially since water is being pulled out from the same water volume through main drains, or skimmers, which impairs the effect of the nozzles and generates currents of water between the inlets and the outlets, creating "dead zones" that have minimal or no mixing nor recirculation. Therefore, regulations worldwide for traditional swimming pools require the use of evenly distributed inlets, in order to spread the treated water more homogeneously throughout the pool, as well as having evenly distributed outlets to push out the water and achieve an efficient mixing and recirculation of the water. For larger water bodies, this "dead zone" effect is greatly amplified, and therefore to achieve the same levels of efficient filtration as a traditional small-sized swimming pool, a very large number of evenly distributed and spaced inlets and outlets would be necessary, as well as the corresponding large filtration units to achieve a high turnover rate of at least four times the complete volume of the pool per day and associated large pumps and equipment. In this sense, the layout and configuration of such inlets and outlets to withdraw water from the structure and then to return filtered water to the structure will depend on many factors, including the geographical location of the water body, climate conditions, local contamination like sand, silt, airborne particles, particles contained in inlet water, wind patterns, bather's patterns, and internally generated currents and flows, among other factors.

On the other hand, if a small quantity of inlets and outlets are used within the structure containing the large water body, the filtration efficiency decreases as there is no homogeneous mixing and recirculation of water, which also results in "dead zones" and areas with lower movement of water that are therefore not filtered with the same intensity than other portions of the water. Therefore, such use of reduced systems in larger water bodies that aim to lower the construction and operation costs, do not achieve the filtration efficiency of traditional filtration systems for smaller and lower volume swimming pools, and in turn causes poor water quality, higher turbidity, and potentially dangerous conditions.

As a reference, regulatory agencies around the world generally require that inlets and outlets are properly distributed and placed around the swimming pool's water volume and structure, which allows the homogeneous withdrawal and homogeneous filtering of the water volume, reducing thus the risk of the so called "dead zones". The inlets and outlets shall have an adequate design, location, and in a number enough to ensure the effective distribution of treated water throughout the pool's water volume, as well as being able to maintain an effective amount of disinfectant residual in the pool's volume, and so that the complete water volume is filtered homogeneously numerous times per day, without creating dead zones or areas of the pool where there may be no treatment or recirculation through a filtration system given the design, number, or location of such inlets and outlets.

For example, Florida swimming pool regulations require that pools larger than 30 feet in width (about nine meters) and that have a combination of wall and floor inlets, should have:

- A number of wall inlets such that the maximum spacing between the wall inlets is 20 feet (about six meters) and floor inlets are provided for the pool water area beyond a 15 feet (about 4.5 meters) perpendicular distance from all walls; and
- A number of floor inlets such that the spacing between adjacent inlets does not exceed 20 feet (about six meters) and the distance from a floor inlet and an adjacent wall does not exceed 25 feet (about 7.6 meters).

Therefore, in such a case, the total area per nozzle is 20'×20' or 400 $ft^2$, which would mean that a swimming pool of 100,000 $ft^2$ (about 2.3 acres) would require at least 250 bottom inlets, and their respective pump and highly complex piping network.

As another example, in Florida, public swimming pool regulations require the recirculation flow to be designed to provide a minimum of four turnovers of the pool volume per day in order to achieve a homogeneous filtering of the water volume.

Skimmer systems in traditional swimming pools are also expensive and complex. In terms of the use of skimmers/gutters, pool regulations require that 100% of the recirculation water flow may be processed through the skimmers, which generally requires the presence of gutters along the complete perimeter of the pool, or with minimal disruption, in order to be able to homogeneously distribute the surface water through such system when being withdrawn from the pool in order to be sent to the centralized filtration system. Florida regulations even require that at least 90% of the pool perimeter to have gutters, and skimmers every 400 square feet of pool area (for smaller pools) in order to achieve a homogeneous filtering of the water volume. The above means that a swimming pool of 100,000 $ft^2$ (about 2 acres) and 1,200 ft in perimeter, would require a huge gutter in at least 90% of the perimeter, of about 1,000 ft to achieve that same level of homogeneous filtration.

These regulatory and sanitary requirements lead to very high costs associated with the structure to contain and treat large swimming pools.

Therefore, alternative structures and configurations are required, in order to provide for the containment and purification of larger water bodies in order to safely allow direct contact recreational purposes at lower capital and operation costs, and therefore being able to provide large high transparency water bodies at costs lower than a conventional swimming pool.

BRIEF DESCRIPTION OF THE DRAWINGS

In the drawings in which the elements are identified with the same designation numeral.

DESCRIPTION OF THE INVENTION

Figure 1:
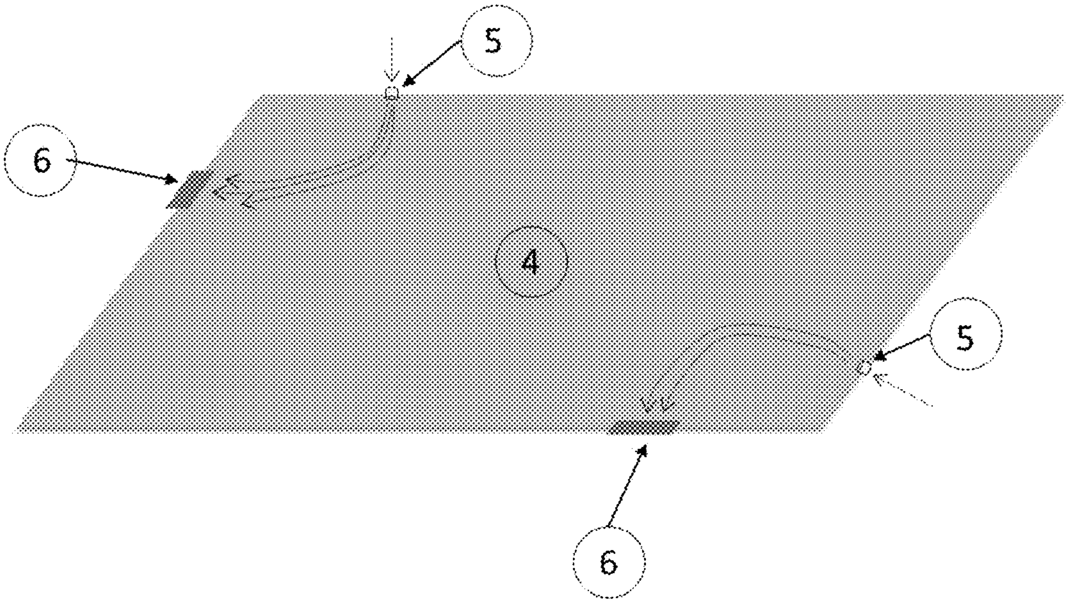
Figure 1 PRIOR ART
FIG. 1 shows a schematic aerial view of a water body having a few make-up water pipes or inlets (5) and a few renewal outlets or discharge pipes (6), which generates “dead zones” (4) within the water body.

The present invention provides for a low cost structure comprising a system and structural components that, with a reduced and less expensive centralized filtration system, allows to contain and purify water at lower costs than traditional swimming pools, for direct contact recreational uses. The present invention discloses a low cost structure that has a surface of at least 3,000 $m^2$ and a water volume of least 5,000 $m^3$, which is configured for containing and purifying low turbidity water (2) of less than 2 NTU, and that is suitable for direct contact recreational purposes.

The low cost structure of the present invention has a surface of at least 3,000 $m^2$ and a water volume of at least 5,000 $m^3$. However, in an alternative embodiment of the present invention the low cost structure does not have a minimum surface area. If this is the case and the low cost structure has a surface area less than 3,000 $m^2$ its water volume is up to 5,000 $m^3$.

As used herein, the reduced centralized filtration system refers to a system that uses less inlets, outlets, skimmers, and/or filtration equipment than a conventionally designed and operated swimming pool, and therefore is not intended to achieve the same recirculation pattern and/or filtration rate than a conventionally designed centralized swimming pool filtration system.

Also, as used herein, a conventionally designed and operated swimming pool refers to a swimming pool designed and operated as per Florida’s Public Swimming Pool Regulations.

Also, as used herein, an effective filtration refers to the filtration of a water volume that reduces the formation of short-circuits and dead zones within a water volume.

Further, as used herein, homogeneous filtration refers to the filtration resulting from operating a conventional swimming pool designed and operated as per Florida's Public Swimming Pool Regulations.

The low-cost reduced centralized filtration system (20) from the present invention is improved with a micro-renewal system and a dual-frequency skimmer system, comprising a high-frequency (41) and low-frequency skimmer system (42). Therefore, the structure of the present invention allows containing and purifying water that is suitable for direct contact recreational purposes improving such reduced low-cost centralized filtration system, where the structure of the present invention comprises at least four elements:

A. A low-cost reduced centralized filtration system (20) that has fewer inlets, outlets, skimmers, and filtration water volume rates compared to a conventional swimming pool as previously defined.

B. A permanently operative water micro-renewal system so that micro-leakage points (31) are distributed throughout the inner surface of the structure to allow an efficient removal of water from the structure (1), and where the system is improved by the use of high-quality make-up water that is introduced into the structure to achieve a partial renewal of water through the micro-leakage points (31). This system allows to improve the efficiency of the low-cost reduced centralized filtration system (20).

C. A high-frequency skimmer system HFSS (41) that allows for the removal of surface water from the structure (1), and which has a reduced capacity design compared to conventional swimming pool skimmer systems.

D. A low-frequency skimmer system LFSS (42) that allows for the removal of water from the upper portion of the water volume during rain events or increased renewal events, among other events, and which improves the use of the high-frequency skimmer system.

These four components of the low-cost structure of the present invention will be described in more detail in the following sections.

A. Low-Cost Reduced Centralized Filtration System (20)

The low-cost reduced centralized filtration system as described in the present invention refers to a centralized filtration system that has a reduced configuration and capacity compared to a conventional swimming pool centralized filtration system as defined by Florida Public Swimming Pool Regulations.

The reduced low-cost centralized filtration system requires a fewer number of inlets (21) and outlets (22) to extract and return water from and to the structure, as well as a smaller filtration equipment (24) that allows filtering a smaller water volume compared to a conventional swimming pool centralized filtration system, as it can be seen in the following Table:

| Parameter | Conventional Swimming Pool Centralized Filtration System | Reduced Low-Cost Centralized Filtration System |
|---|---|---|
| Number of Bottom Inlets | Based on Florida's public swimming pool regulations, which require a total area per inlet of about 400 $ft^2$. For example, a swimming pool of 100,000 $ft^2$ (about 2.3 acres) would require at least 250 bottom inlets, and their respective pump and highly complex piping network. | The number of inlets is defined as being at least 30% less than the number of inlets required in regulations in Florida. Using the same example of the 2.3-acre water body, the number of inlets required would be 175 inlets or less ($250 - 250 \times 0.3$). |
| Filtration Rate | Able to filter the complete water volume contained in the swimming pool structure at least four times per day homogenously. | Able to effectively filter at least 30% less volume within a 24-hour period, compared with the filtration rate required to filter the complete volume water volume four times per day, according to Florida swimming pools regulations. |
| Homogeneous filtration | More Homogeneous. | Less Homogeneous. |

In more detail, the reduced low-cost centralized filtration system from the present invention comprises:

I. A plurality of outlets (22) to withdraw water from the structure,

II. a reduced filtration equipment 24) that is configured to filter such water flow withdrawn through the outlets, and III. a network of inlets (21) to introduce the filtered water back into the structure The plurality of outlets (22) to withdraw water from the structure of the present invention is configured in order to pull out water from the structure at a rate that is lower than the recirculation water volume from a public swimming pool based on Florida regulations.

In particular, the network of outlets (22) is required to be able to withdraw at least 30% less volume within a 24-hr period, compared with the filtration rate required to homogeneously filter the complete volume water volume four times per day as in Conventional Swimming Pool Centralized Filtration Systems. For example, a structure having a volume of 15,000 $m^3$ would need to filter its complete water volume at least four times per day based in Florida Public Swimming Pool Regulations, which would mean that 60,000 $m^3$ would need to be withdrawn from the structure and sent to the filtration system each day, resulting in a recirculation/filtration water volume of 2,500 $m^3/h$. On the other hand, the present invention requires withdrawing and effectively filtering at least 30% less volume within a 24-hr period than for a conventional swimming pool filtration system, meaning the present invention would require to withdraw and effectively filter at least 30% less volume, corresponding to a volume of up to 42,000 $m^3$ per day (60,000 $m^3$-0.3×60,000 $m^3$=60,000 $m^3$-18,000 $m^3$), equivalent to up to 1,750 $m^3$/h.

Thus, the low-cost reduced centralized filtration system (20) is able to effectively filter at least 30% less volume within a 24-hour period, encompassing all values within, including, for example, about 40% less volume, about 50% less volume, about 60% less volume, about 70% less volume, about 80% less volume, about 90% less volume, or less compared with the filtration rate required to homogeneously filter the complete volume water volume four times per day.

The low-cost reduced filtration system (20) generally comprises at least one filtration equipment (24) and at least one pumping equipment, and is configured to filter the reduced water flow withdrawn through the outlets (22), as previously described. The reduced water flow withdrawn from the structure in order to effectively filter at least 30% less volume compared to the traditional filtration rates of public swimming pools in Florida allows to significantly reduce costs given the less-complex piping network, valves, pumps, and other elements associated with the outlets.

Also, the number of bottom inlets from the present invention is defined as being at least 30% less than the number of bottom inlets required in regulations in Florida. As previously indicated, in Florida Public Swimming Pool Regulations, it is required that bottom inlets cover a total area about 400 $ft^2$ per inlet, where bottom inlets should not be located more than 20 ft from each other, in order to allow for a homogeneous distribution of water with additives and also to achieve an effective filtration.

On the other hand, the present invention requires at least 30% less inlets than the number of bottom inlets required in Florida Pool Regulations. Thus, the number of bottom inlets from the present invention is defined as being at least 30% less than the number of bottom inlets required in regulations in Florida and any value of number of inlets within, such as 40% less, 50% less, 60% less, 70% less, 80% less, or 90% less than the number of bottom inlets required in regulations in Florida Pool Regulations. As a numeric example, if public swimming pool regulations in Florida require a total number of bottom inlets of 250, then the present invention may comprise a number of bottom inlets of within 0 to 175 inlets, including having 170 inlets, or 150 inlets, or 125 inlets, or 100 inlets, or 75 inlets, or 50 inlets, or 25 inlets, among other numbers of inlets.

The minimum number of bottom inlets (21) from the present invention given the minimum water surface of 3,000 $m^2$, is defined as being 15 bottom inlets, which is calculated as:

Number of bottom inlets (21) required for a conventional swimming pool based on Florida public swimming pool regulations=75 bottom inlets At least 80% less inlets will be used=75−0.8×75=75−60=15 Bottom Inlets As shown in Table 1, as a reference, a swimming pool of about 100,000 $ft^2$ (about 2.3 acres) would require at least 250 bottom inlets from a simple calculation of dividing the total surface and the maximum coverage per inlet (100,000 $ft^2$/400 $ft^2$), and therefore, for the same structure, the present invention would require 175 inlets or less. In such case, any number of inlets within 15 to 175 bottom inlets would be in the range of the number of bottom inlets from the present invention.

The minimum number of inlets (21) is necessary to achieve a minimum distribution that allows the low-cost structure (1) from the present invention to achieve a reduced filtration system that is complemented with a water micro-renewal system.

It is important to note that the inlets are only a part of the problem in conventional swimming pool systems, since the inlets need to be connected to piping, have their own support structures, include valves and connectors, and having their hydraulic connection to the pumping elements, and therefore reducing the amount of inlets allows to reduce the complexity and cost of the associated piping network and pumping elements.

B. Water Micro-Renewal System

The water micro-renewal system is an improvement to the low-cost reduced centralized filtration system (20), which allows providing a generally permanent and more homogeneous water renewal of the water volume contained within the structure (1) resulting from the micro-leakage of water passing through the inner surface of the structure.

When using a low-cost reduced centralized filtration system (20) that has fewer inlets than conventional centralized filtration systems from swimming pools, as in the present invention, such reduced centralized filtration would not be as effective as a conventionally designed swimming pool that requires and uses a large number of inlets to provide a homogeneous filtration of the water volume. Therefore, such a system needs to be improved with a water renewal system in order to still allow for an effective filtration of the water volume. However, if the low-cost reduced centralized filtration is complemented, for example, with a renewal system having only a few make-up water pipes or inlets (5) and a few renewal outlets or discharge pipes (6), the renewal of water would be very inefficient and would create massive dead zones as seen in the aerial perspective view of a water volume in FIG. 1.

Figure 2:
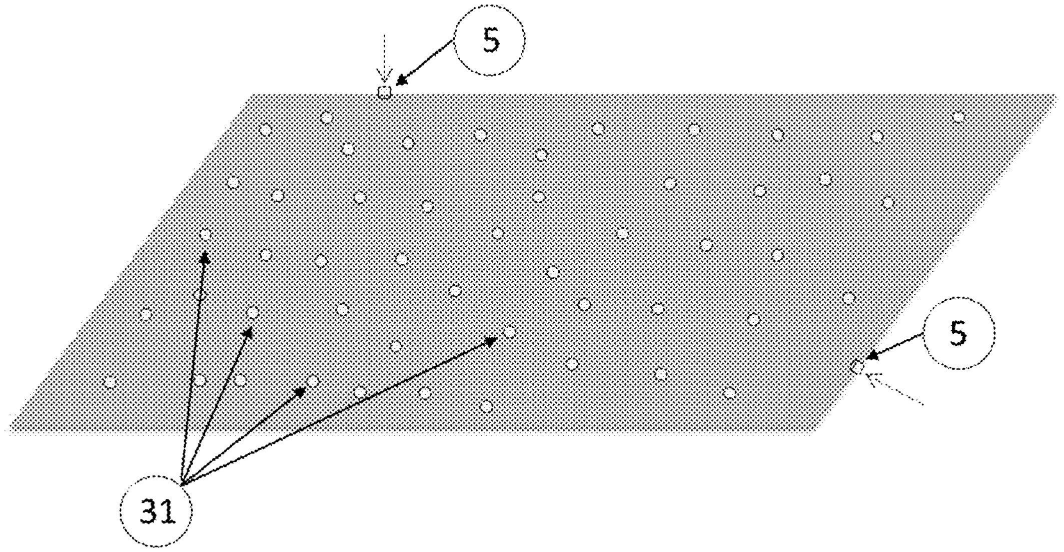
FIG. 2 shows a schematic aerial view of a water body according to an embodiment of the invention, having a few make-up water pipes or inlets (5) and a large number of micro-leakage points (31) distributed along the inner surface of the water body, which minimizes the generation of dead zones.

On the other hand, the innovative water micro-renewal system from the present invention comprises a few bottom inlets (21) and multiple micro-leakage points (31) that allow generating a more homogeneous and permanent renewal of water from the structure. This more homogeneous renewal of water allows for a highly efficient renewal of water without creating massive dead zones, as it can be seen in FIG. 2, which shows an aerial perspective view of a water volume having a few inlets (21) and a plurality of micro-leakage points (31) that allow achieving a homogeneous renewal.

Figure 3A:
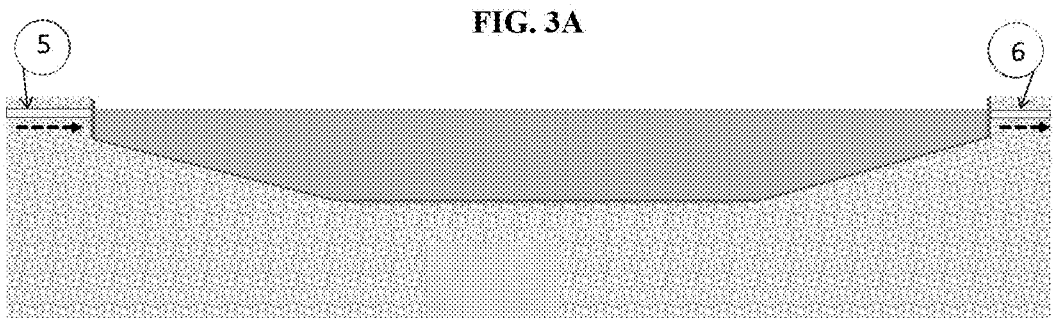
FIG. 3A shows a structure including one make-up water pipe or inlet (5) and one renewal outlet or discharge pipe (6), which generates an ineffective renewal of water.
Figure 3B:
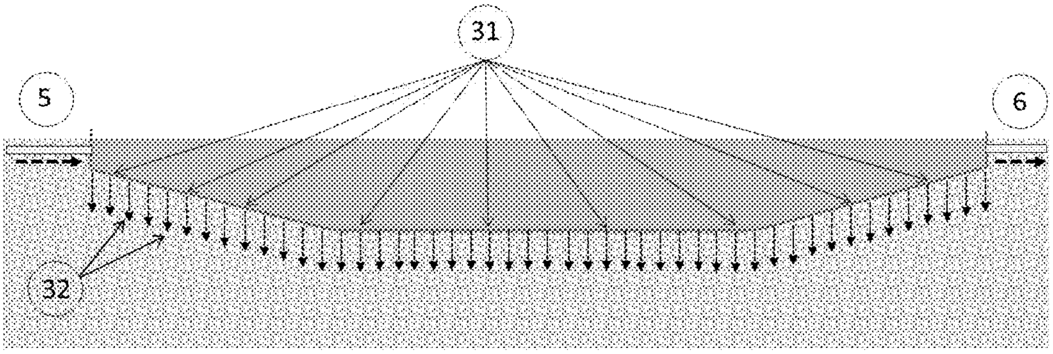
FIG. 3B shows an equivalent structure but improved with an additional micro-renewal system comprising multiple micro-leakage points (31) that allow providing for a more homogeneous renewal of water and generate a micro-leakage flow (32).

A similar comparison is shown in FIG. 3A which shows a side view of a structure having only one make-up water pipe or inlet (5) and one renewal outlet or discharge pipe (6), compared to FIG. 3B that shows an embodiment having multiple micro-leakage points (31).

Therefore, it is important to improve the low-cost reduced centralized filtration system (20) with a micro-renewal system having a plurality of micro-leakage points (31), which aim to provide a more homogeneous renewal of water that improves the effect of the low-cost reduced centralized filtration system (20).

Micro-leakage refers to the leakage of small water flows through the inner surface of the structure that contains the water body, which can be achieved by the use of systems and/or materials that create a plurality of micro-leakage points (31) distributed throughout the inner surface of the structure, referred to herein as micro-leakage elements.

The micro-leakage point (31) refers to an area within the inner surface of the water body where there is a hydraulic connection between the water volume contained in the structure and the soil or filling material under the structure. Preferably, the micro-leakage points (31) are situated throughout the inner surface of the structure that is in contact with the excavated soil (3). On another embodiment, the micro-leakage points (31) are situated throughout the inner surface of the structure that is in contact with the filling material.

In the present invention, the water volume removed from the structure through micro-leakage is preferably lower than the volume of water filtered by the low-cost reduced centralized filtration system (20).

As a reference, and in certain embodiments, the micro-leakage water flow removed from the structure is estimated to be at least 30% less, compared to the volume of water filtered by the reduced low-cost centralized filtration system (20), wherein the micro-leakage water volume is removed from the structure through the micro-leakage points (31).

It is important that the soil or filling material (3) under the structure should have a permeability coefficient sufficient enough so that there is no substantial accumulation of water under the structure that can affect the integrity of the structure, given that such soil or filling material (3) may continuously receive water from the micro-leakage points (31). The soil under the structure can have different types of permeability, which can be separated in:

- Low permeability: Soils with a hydraulic conductivity of less than $1\times10^{-7}$ cm/s
- Medium permeability: Soils with a hydraulic conductivity of between $1\times10^{-3}$ to $1\times10^{-7}$ cm/s
- High permeability: Soils with a hydraulic conductivity of more than $1\times10^{-3}$ cm/s The soil under the structure and the type of solution used below the micro-leakage element are configured to allow the passage of water without generating substantial accumulation of water directly under the micro-leakage element, which may cause structural and/or aesthetic impact to the structure.

The micro-leakage points (31) may be created by the use of micro-leakage materials and/or systems that, given their use, installation, or placement within the inner surface of the water body, are not 100% stagnant or create crevices or openings within the inner surface, and therefore generate a plurality of points that generate micro-leakage, herein referred to as micro-leakage points (31).

In an embodiment of the invention, the micro leakage points (31) may be created by the use of netting or grated elements and a set of valves to achieve a uniform micro-leakage from the inner surface of the structure.

Micro-leakage materials and systems comprise materials with grill configurations, which are used for the containment of water in the structure and to allow passage of water. The micro-leakage materials may include a grid material (34), the use of woven geotextiles, netting materials, fabric materials, textile materials, plastic materials, thermoplastics materials, membranes, or combinations thereof. The micro-leakage materials create points and may be looped, attached, knitted, heat sealed, induction heat sealed, twisted, or knotted so that intersections are present, which create a plurality of micro-leakage points within such materials. As a further alternative, the micro-leakage materials comprise the use of materials that include crevices, welding points, or joints through which leakage is generated, or materials that have punctures.

The micro-renewal system of the invention allows to improve the low-cost reduced centralized filtration system (20), since it creates a renewal of water at a smaller scale, but evenly distributed throughout the inner surface of the structure, facilitating thus a more homogeneous renewal. The micro-renewal system is more efficient than the traditional renewal of water with only a small number of discharge points and make-up water inlets that would create channels and dead zones (as seen in FIG. 1). This micro-renewal system that improves the reduced low-cost centralized filtration system (20) creates a low-cost efficient filtration system that allows purification of water at much lower capital and operational costs than traditional swimming pools systems.

The micro-leakage points (31) allow generating a water flow through such points, which is removed from the structure. In an embodiment of the invention, the micro-leakage water flow is 0.1 to 0.5 liters per second per hectare of inner surface of the structure exposed to the water volume.

The micro-leakage points (31) should be periodically cleaned with a cleaning device so that they do not become clogged or obstructed in a way that would hinder them from creating a micro-leakage water flow. Avoidance of clogging from such micro-leakage points (31) should be checked and cleaning such micro-leakage points should be performed periodically to avoid them from hindering their capacity of micro-leakage. The micro-leakage points (31) may be unobstructed by means of removing clogging sediments either manually or through automatic means, through brushing cleaning systems, by using vacuum-based devices that suction potentially clogging sediments and particles from the micro-leakage points and their surface, among others. The cleaning of the micro-leakage points avoids them becoming clogged and/or obstructed.

Figure 4:
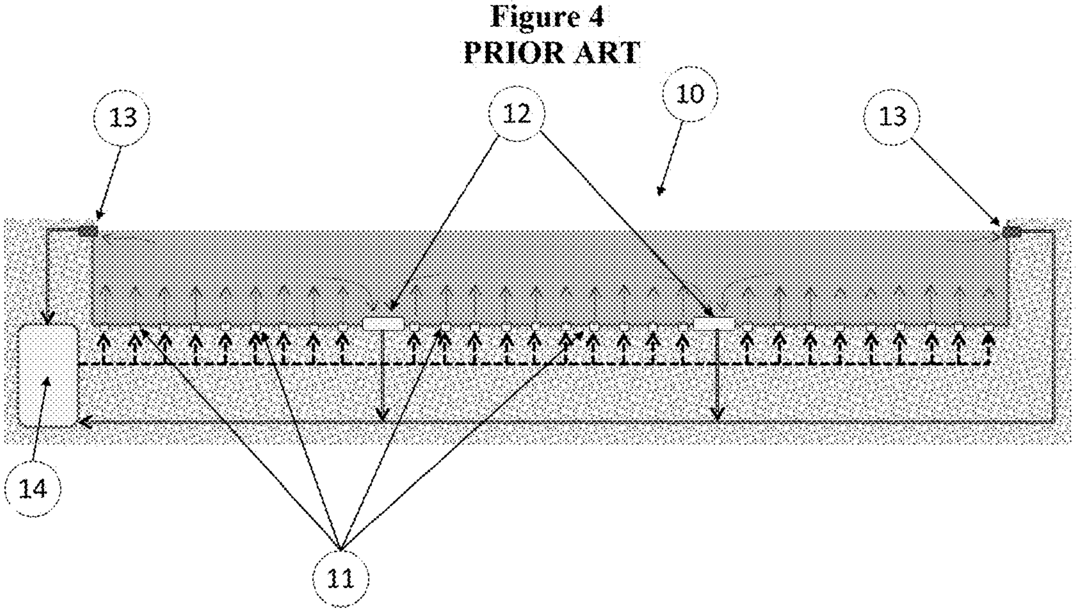
Figure 4 PRIOR ART
FIG. 4 shows a schematic side view of a conventional swimming pool (10) that complies with swimming pool regulations, and having a plurality of bottom inlets (11), main drains (12), skimmers (13) and a centralized filter (14).
Figure 5:
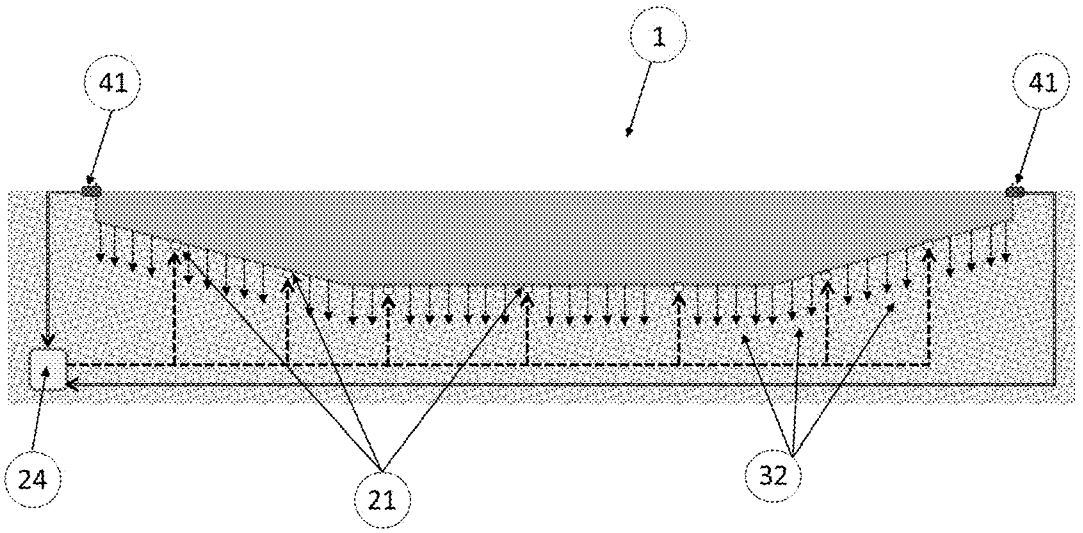
FIG. 5 shows a schematic embodiment of the low-cost structure (1) of the present invention, showing the reduced number of bottom inlets (21), a high-frequency reduced skimmer system (41) a reduced filter (24), and the micro-leakage water flows (32) flowing through the micro-leakage points (31) of the micro-renewal system. The low-frequency skimmer system LFSS (42) is not shown.
Figure 6:
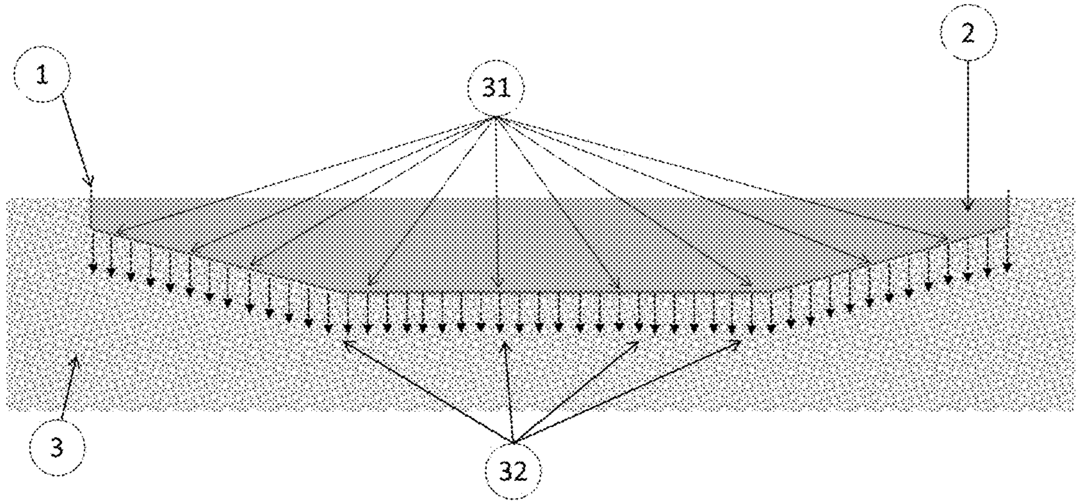
FIG. 6 shows a schematic embodiment of the low-cost structure (1) of the present invention, wherein the structure (1) contains the water volume (2), and the structure comprises a plurality of micro-leakage points (31) within its inner surface, which allow to remove water from the structure (1) since each micro-leakage point (31) has an associated micro-leakage point water flow (32) that is being removed from the structure (1) and into the excavated soil or filling material (3). The low-frequency skimmer system (LFSS) is not shown.
Figure 7:
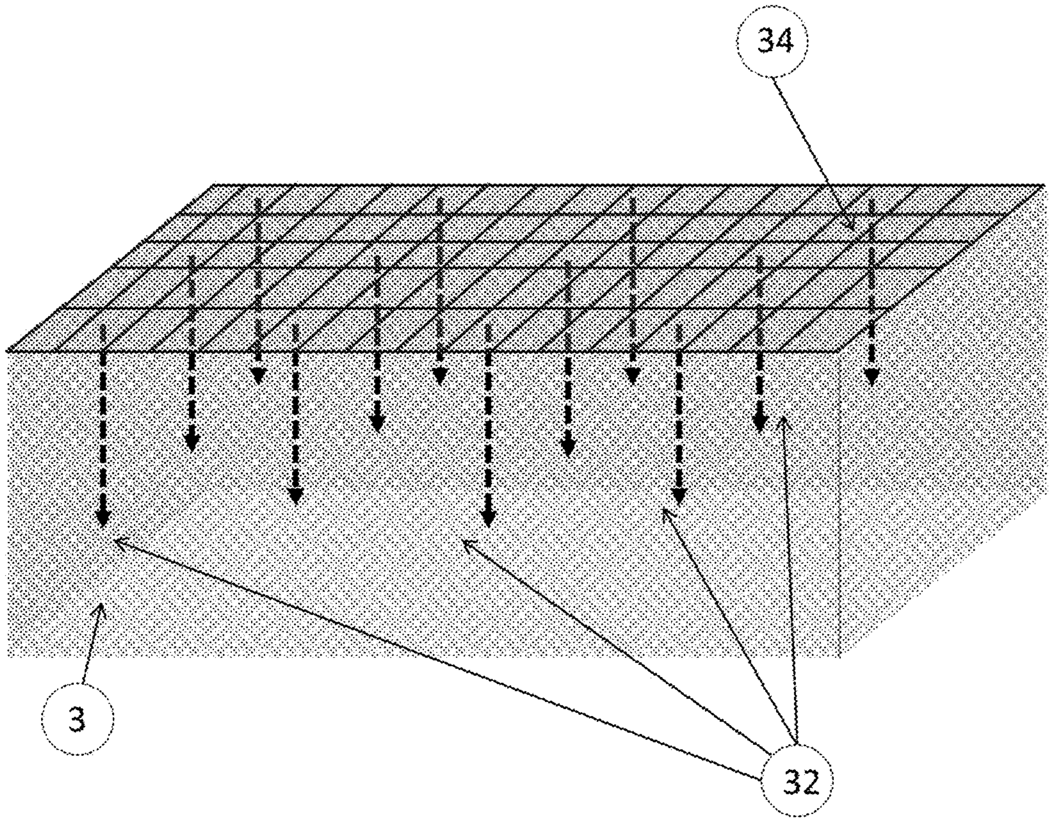
FIG. 7 shows an enlarged section of an embodiment of the micro-renewal system of the present invention, wherein the micro-leakage material is a grid material (34) and is used in the inner surface of the structure, which allows to create micro-leakage points (31) to achieve a micro-leakage flow (32) that is being removed from the structure into the excavated soil or filling material (3).

The micro-renewal system allows to improve the effect of the low-cost reduced centralized filtration system (20) facilitating thus a more homogeneous renewal. For example, as it can be seen in FIG. 4, a conventional swimming pool centralized filtration system withdraws water from swimming pool skimmers (13) and through main drains (12), sends such water into a centralized filter (14), and then returns the filtered water through a large number of inlets (11) calculated and distributed according to regulations, in order to achieve swimming pool filtration rates. Now, as it can be seen in FIG. 5, a low-cost reduced centralized filtration system of the present invention is present, which has a lower number of inlets (21) and has a smaller filtration equipment (24), than a conventional swimming pool, such system being improved by the micro-renewal system that comprises a plurality of micro-leakage points (31) throughout the inner surface of the structure, and which allow to provide a micro-leakage water flow (32) through such points.

C. Use of a High-Frequency Reduced Skimmer System (HFSS)

Despite the fact that the micro-renewal system allows to improve the purification of water due to an increased water renewal compared to the use of a reduced centralized filtration system only, such micro-renewal system does not target the purification or treatment of the water portion closer to the surface water body structure, which is an important part of direct contact recreational facilities.

As previously explained, traditional swimming pools require the use of generally expensive and complex skimmer systems, since, generally, pool regulations require that 100% of a traditionally defined swimming pool recirculation water flow can be processed through the skimmers. Therefore, the skimmer system of traditional pools requires a large number of skimmers or gutters that surround almost the complete perimeter of the pool, in order to achieve proper recirculation and skimming of the surface water volume of the pool to send such water into the centralized filtration system.

On the other hand, the present invention utilizes a high-frequency reduced skimmer system HFSS (41) that allows the removal of water from the surface of the volume (2) contained within the structure (1) (including the upper layer of the water volume in contact with the skimmer), wherein such HFSS (41) has a reduced configuration compared to a conventional swimming pool skimmer system as described in the next section.

Generally, a conventional swimming pool skimmer system generally has to be designed and configured to withdraw the complete recirculation/filtration water flow from the pool and be able to send such flow to a filtration system. The skimmer system has to be designed and calculated to handle the total flow of water that needs to be filtered from a conventional swimming pool, which results from filtering the total volume of water at least four times per day.

On the other hand, the high-frequency reduced skimmer system (HFSS) from the present invention uses a reduced design, wherein the skimmers are positioned and configured to withdraw at least 30% less volume within a 24-hr period, compared with the withdrawal rate required to homogeneously filter the complete volume water volume four times per day as in Conventional Swimming Pool Centralized Filtration Systems.

The high-frequency reduced skimmer system (HFSS) may be positioned and configured to withdraw said at least 30% less volume within a 24 hr. period, and encompasses all values within, including, for example, at least 40% less, at least 50% less, at least 60% less, at least 70% less, at least 80% less, or at least 90% less volume within a 24 hr. period, compared with the withdrawal rate required to homogeneously filter the complete water volume four times per day as in Conventional Swimming Pool Centralized Filtration Systems.

For example, a structure having a volume of 15,000 m3 would need to filter its complete water volume at least 4 times per day based in Florida Public Swimming Pool Regulations, which would mean that 60,000 m3 would need to be withdrawn from the structure and sent to the filtration system each day, resulting in a recirculation/filtration water volume of 2,500 m3/h. Therefore, such a structure would require a skimmer system that is able to withdraw 100% of such water flow only through the skimmers located in the structure's perimeter.

On the other hand, the present invention requires that the HFSS (41) is configured to be able to withdraw at least 30% less volume within a 24-hr period compared to a conventional swimming pool system, and therefore the present invention would require having a HFSS (41) configured to and able to withdraw up to 1,750 $m^3$/h of water through the skimmers. This, in turn, allows that the number and configuration of skimmers required to withdraw such reduced water flow from the structure allows to significantly reduce costs, given the less-complex piping network and others associated with the skimmer system.

The HFFS (41) sends the removed water to the low-cost reduced centralized filtration system (20), in order to treat and/or filter such water before returning it back into the structure. As described in the following Table, the HFSS uses a reduced skimmer system compared to conventional skimmer systems for swimming pools based on regulatory requirements:

| Parameter | Conventional Swimming Pool Centralized Filtration System | Low-Cost Reduced Centralized Filtration System (20) |
|---|---|---|
| Capacity of Skimmer System | Based on Florida swimming pool regulations, which require that 100% of the recirculation water flow can be processed through the skimmers, which generally requires the use of gutters along the complete perimeter of the pool (or at least 90% of the pool), or with minimal disruption. | High-Frequency Reduced Skimmer System (41) requires to withdraw at least 30% less volume within a 24 hr. period, compared with the withdrawal rate required to homogeneously filter the complete volume water volume four times per day as in Conventional Swimming Pool Centralized Filtration Systems |

D. Use of a Low-Frequency Skimmer System (LFSS)

Figure 8:
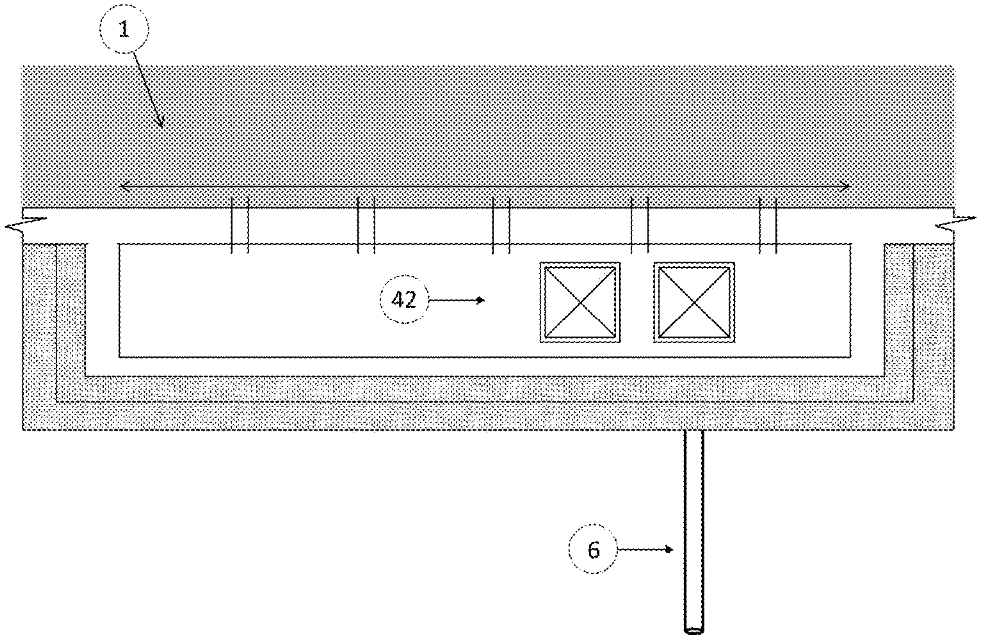
FIG. 8 shows a schematic aerial top view of an embodiment of the structure (1) of the present invention as well as the low-frequency skimmer system LFSS (42) and one discharge water pipe (6).
Figure 9:
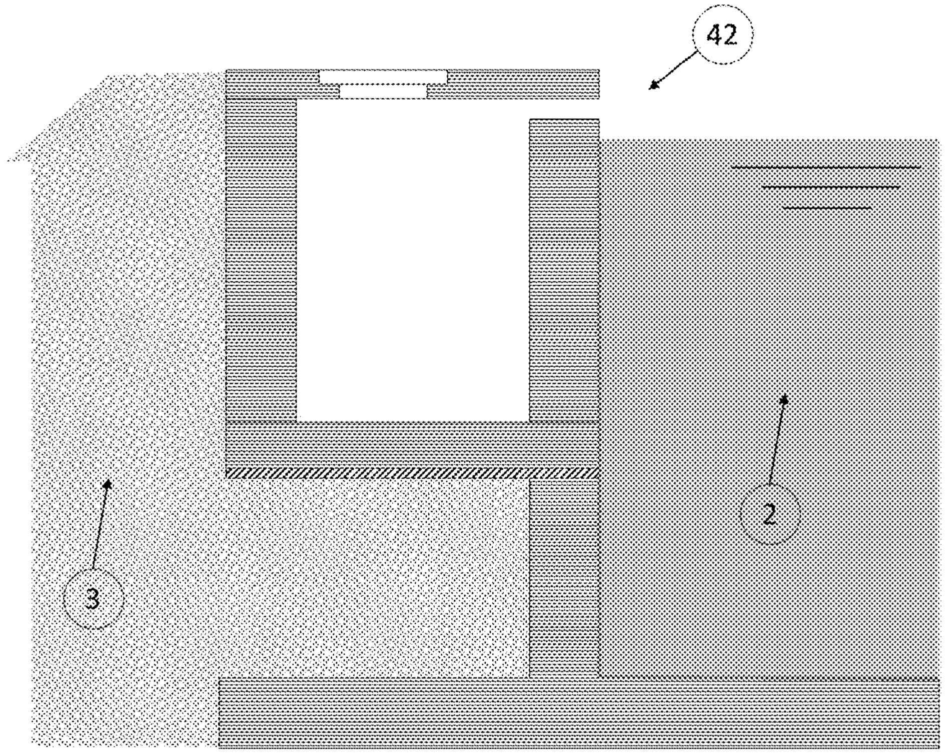
FIG. 9 shows a schematic side view of an embodiment of the low-frequency skimmer system LFSS (42) and the opening that is located above the water level.
Figure 10:
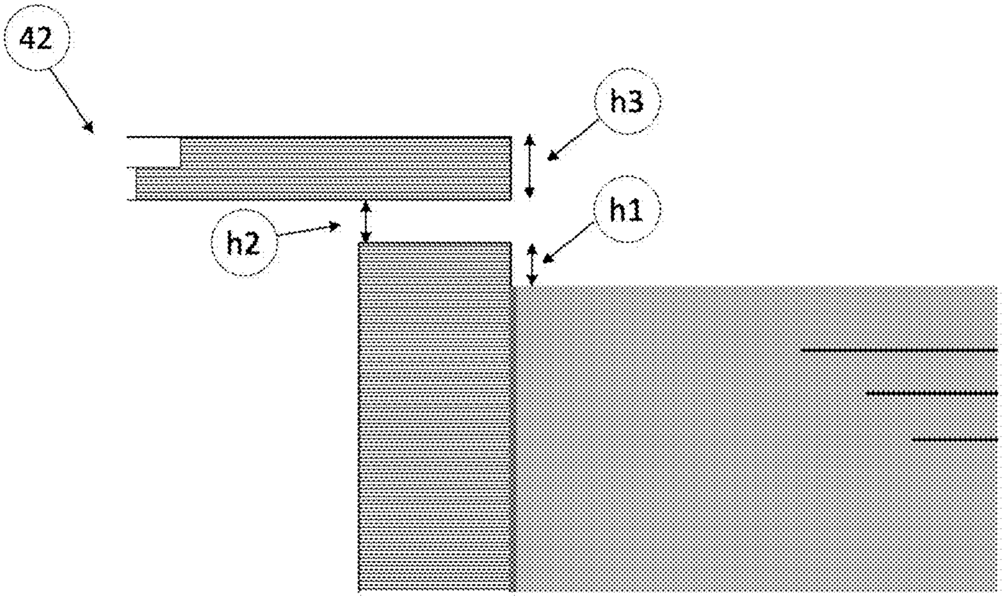
FIG. 10 shows a schematic enlarged side view of an embodiment of the low-frequency skimmer system LFSS (42), and referential heights h1, h2, and h3 that denote the distance from the water level to the lower weir opening point, the height of the weir opening, and the thickness of the weir upper structure, respectively.

The present invention also comprises a low-frequency skimmer system LFSS (42) that removes water from the surface and/or upper part of the water body during planned or specific situations and with less frequency than the HFSS, as depicted in FIGS. 8, 9 and 10. The LFSS preferably operates during rain events where an increased volume of water enters the structure, and therefore the low-frequency skimmer system (42) is used to provide increased renewal through this addition of rainwater into the system, which helps to improve the effect of the high-frequency reduced skimmer system. The low-frequency skimmer system (42) is able to remove water from the water body during specific situations such as stormwater events, or during determined increased renewal events, as it is described in the following paragraphs.

The use of the low-frequency skimmer system (42) allows providing an additional source of water renewal from the water surface or the upper layer of the water surface, which is generally not affected or is minimally affected by the micro-renewal of water. In that sense, the LFSS (42) also helps to improve the use of the high-frequency reduced skimmer system (41), by providing an increased renewal of water through the removal of water located in the upper part of the water body during certain events of periods of time.

The low frequency skimmer system (42) is generally used during stormwater or rainfall events that cause the water level of the water body to rise into predetermined levels where water must be discharged. Also, the low-frequency skimmer system (42) may also be used during high-renewal events where larger make-up water flows enter the water structure in order to achieve a higher renewal rate, wherein the low-frequency skimmers operate by removing water from the structure, which allows to create an "open" cycle where make-up water is introduced into the structure, and the water that is found in the surface is removed from the structure.

It is important to highlight that the low frequency skimmer system (42) is not just simple overflow from the structure into its surroundings, which would happen naturally during a stormwater event if water kept falling into the structure such that the volume of water entering the structure surpasses the freeboard volume and no other means are used to remove it from the structure. The present invention requires that there are currents that mix and move the water volume in the upper layer of the water volume, in order to achieve an efficient renewal of the upper layer of the water body, and therefore a simple overflow into the surroundings of the structure may not achieve such purpose.

As used herein, the freeboard volume is the volume of water that the structure could contain in addition to its design water volume. The freeboard volume may change depending on the water level and its variation during time. The present invention requires a minimum freeboard volume, such that the minimum freeboard distance between the water level and the top most containment structure of the water volume is at least 5 cm.

The use of the low-frequency skimmer system (42) improves the effect of the high frequency reduced skimmer system (41), in order to remove water volume from the upper section of the structure, which comprises the upper surface of the water, and allows removing surface water as required.

The low-frequency skimmer system (42) of the present invention may not be hydraulically connected to the low-cost reduced centralized filtration system, but instead the water extracted through the low-frequency skimmer system may be removed from the structure. Such water removed through the low-frequency skimmer system (42) is preferably disposed of, in contrast to the low-cost reduced centralized filtration system that returns the filtered water to the structure. However, such water can also be used for irrigation purposes, infiltration purposes, or other purposes, including use of such water for filtration and treatment prior to being used for recreational purposes, among others.

The low-frequency skimmer system (42) may have a perimeter weir configuration, an overflow structure, a perimeter opening structure located in at least one portion of the perimeter of the structure, or a combination thereof. Generally, the LFSS (42) configuration is designed based on precipitation data and IDF curves (intensity, duration, frequency curves) for the specific location where the structure is located, and characteristics of the soil below the structure of the water body. The characteristics of the soil beneath the structure are determined based on a geotechnical study that determines the capacity of water infiltration and seepage into the soil. Further, it must be taken into account the runoff coefficient, the calculation of water directly falling over the water structure's surface (direct receiving of water). Other variables and methods of calculation may also be used for determining the parameters and configurations of the LFSS (42). With those variables, at least one storage curve (SC) is determined, which indicates the amount of water that the structure is able to hold and the rates of holding that water and removing such water from the structure. Based on experience and in the evaluation of the removal rates from the structure, the LFSS is generally designed to be able to remove a water flow the structure.

Figure 11:
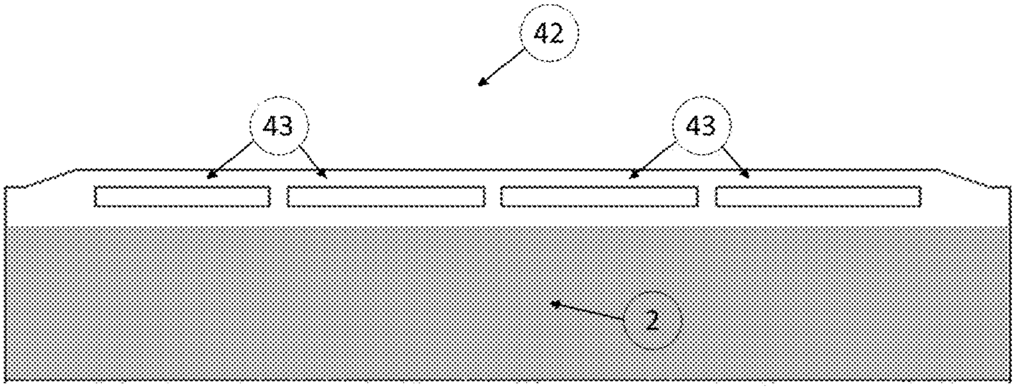
FIG. 11 shows a schematic front view of an embodiment of the LFSS (42), having four weir structures (43) being located with openings above the water level of the water volume (2).
Figure 12:
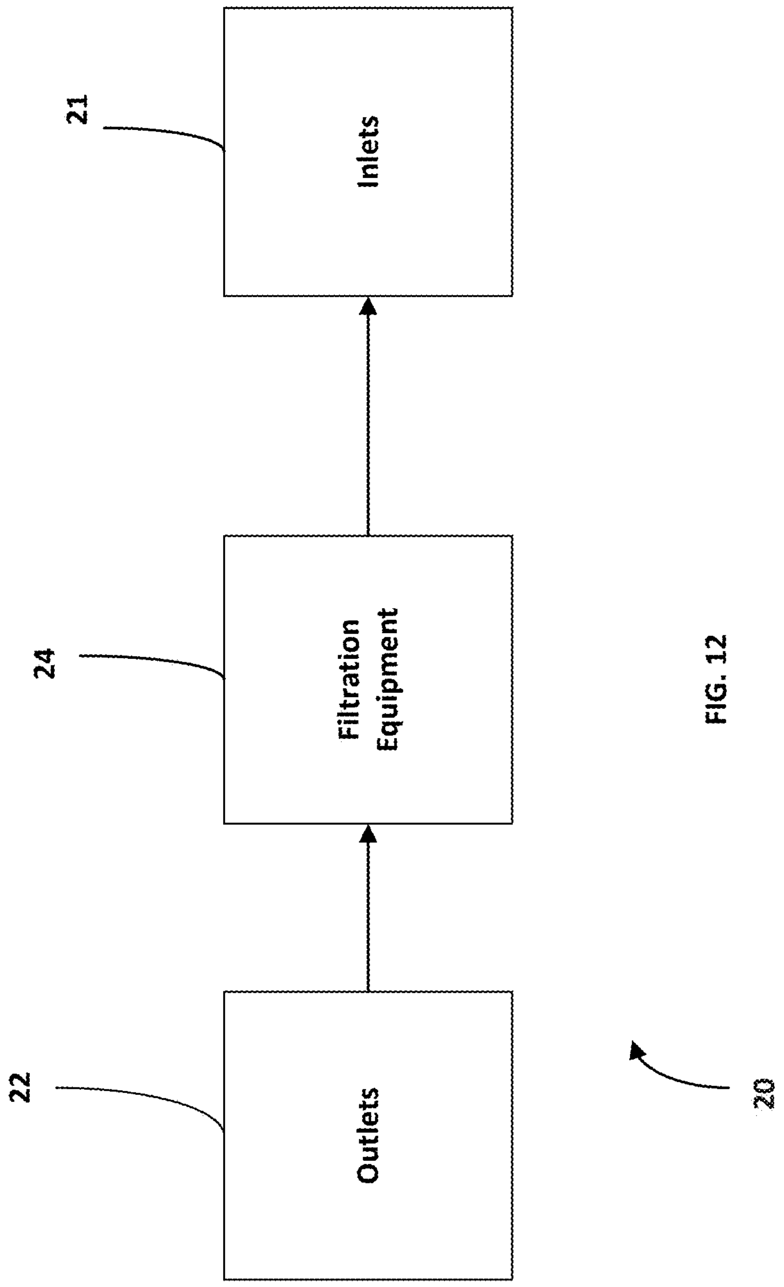
FIG. 12 shows a block diagram of the outlets (22) that remove water from the water body, where the water is delivered to the reduced filtration system (24) and then flows to the inlets (21) to introduce the filtered water back into the water body.

In an embodiment of the invention, the LFSS (42) includes a weir structure (43) as seen in FIG. 11, which includes a weir structure (43) on a length (L) that is wide enough to allow the removal of water at a rate that allows avoiding overfilling the structure with water. This means that the LFSS (42) length should be wide enough in order to allow that the water storage curve at the structure never surpasses the freeboard height or the wall height. The weir length is generally determined by using the leveled method.

In such case, a schematic embodiment is shown in FIG. 9 and FIG. 10, show a weir structure (43) containing "n" openings, each one with a length of "b" and height "h2". These openings are located at a height "h1" from the average design water surface. Once the water passes through the h1 distance, the LFSS will start its operation and removes water from the structure.

In a preferred embodiment of the invention, the LFSS comprises at least one weir structure (43), which aims at being able to remove water from the structure. In a further embodiment of the invention, the weir structure (43) comprises at least two openings for safety and discharge purposes. In such case, the weir structure is generally located within a perimeter wall of the structure so that the openings can be easily seen and cleaned, if needed.

The low-frequency skimmer system (42) is designed to achieve a discharge of water during determined events, in order to improve the efficiency of the high-frequency reduced skimmer system (41), wherein a Skimmer Operation Rate is defined as the ratio of operative hours of the HFSS to the operative hours of the LFSS within a 30-day period of time.

$$\text{Skimmer Operation Rate}(SOR) = \frac{\text{Hours of Operation of } HFSS}{\text{Hours of Operation of } LFSS} \geq 10$$

The Skimmer Operation Rate (SOR) then is a number that results from the division of the number of operative hours of the HFSS to the number of operating hours of the LFSS within a 30-day period, and may be calculated from the average numbers of hours that each skimmer system operates. The SOR is defined as being at least 30, wherein this means that the HFSS operates at least 10 times more time than the LFSS.

For example, if within a 30-day period of time, the LFSS operated 7 hours, then the HFSS is required to operate at least 70 hours during the 30-day period of time.

In the event that the number of hours of operation of the LFSS is 0 during a 30-day period of time, then it is required that the hours of operation of the HFSS is at least 180.

Increased Addition of Make-Up Water

The use of a micro-renewal system requires an increased addition of make-up water into the structure to maintain the water level in the structure within a predetermined design range. In this sense, the make-up water flow has to be higher than the natural evaporation water flow from the water contained in the structure, as described in the following equation:

$$\text{Make-Up Flow} \geq \text{Evaporation Flow} + \text{Micro-Renewal Flow}$$

Wherein the Make-Up Water Flow is expressed in m3/h and is at least the same of higher than the sum of the water flows from:

Evaporation Flow=Average natural evaporation water flow from the water volume within the structure, measured in $m^3/h$ Micro-Renewal Flow=Average water flow that is removed from the structure through the micro-renewal system of the structure, wherein such water flow is lost from the structure through a plurality of micro-leakage points, and measured in $m^3/h$ Therefore, the low-cost structure includes a make-up water system, which together with the rest of the elements of the system, allows containing and purifying water to achieve a large direct contact recreational water body having high clarity, wherein the structure has a lower cost and a less complex configuration than a conventional swimming pool system, mainly given because of the lower number of inlets used throughout the structure, as well as a smaller piping network and associated equipment and elements. It is important to note that the inlets associated with the low-cost structure from the present invention may comprise any type of inlets that are configured to introduce water into the structure, which can comprise bottom inlets, make-up water inlets, renewal inlets, wall inlets, among others. Further, the same inlet may be used to introduce make-up water and to introduce water (that may be mixed with chemicals) into the structure in order to provide an efficient configuration of inlets.

The low-cost structure of the invention comprises a low-cost reduced centralized filtration system (20) that is improved with a micro-renewal water system and a high-frequency (41) and low-frequency skimmer system (42), in order to achieve high quality of water.

The use of the low-cost structure from the present invention allows obtaining high quality water that is suitable for direct contact recreational purposes, including water with clarity lower than 2 NTU.

As used through the current application, the low-cost structure (1) from the present invention refers to structures that may not comprise a full concrete shell that covers the complete inner surface of the structure, as usually used in conventional swimming pools.

Further, the low-cost structure from the present invention aims to be applied in relatively calm waters that have natural inner currents and mixing as a result of the low-cost centralized filtration system, but is not directed to water bodies with a very high mixing rate and variation of water levels such as surf pools or wave pools that include the use of artificial wave generation equipment.

On further detail, the low-cost structure (1) from the present invention comprises elements and configurations that aim at providing a safe environment for swimming, including the use of a sloped access into the structure and the use of man-made sandy beach areas in the surroundings of the structure. In a preferred embodiment of the invention, the use of sandy beach areas is contiguous to at least one sloped access into the structure.

It has been estimated that the system of the present invention can be between 20% and 80% less expensive than a conventional swimming pool designed under Florida public swimming pool regulations, also having up to 80% less operational costs associated with the energy used for the filtration system of a traditional swimming pool.

TABLE 1

Referential Numbers from Figures

| Reference Number | Element |
|---|---|
| 1 | Low-cost structure |
| 2 | Low turbidity water |
| 3 | Excavated soil or Filling Material |
| 4 | Dead Zones |
| 5 | Make-up water inlets |
| 6 | Renewal outlets or discharge pipes |
| 10 | Conventional Swimming Pool |
| 11 | Swimming pool inlets |

TABLE 1-continued

Referential Numbers from Figures

| Reference Number | Element |
|---|---|
| 12 | Main Drains |
| 13 | Skimmers |
| 14 | Centralized Filter |
| 20 | Low-cost reduced centralized filtration system |
| 21 | Bottom Inlets |
| 22 | Outlets |
| 24 | Filtration equipment |
| 31 | Micro-leakage points |
| 32 | Micro-leakage flows |
| 34 | Grid material |
| 41 | High-frequency reduced skimmer system HFSS |
| 42 | Low-frequency skimmer system LFSS |
| 43 | Weir structure |

The invention claimed is:

1. A structure for containing a water body that is suitable for direct contact recreational purposes, wherein the structure comprises:

a reduced centralized filtration system that filters a volume of water of the water body, wherein:

the reduced centralized filter system comprises a number of bottom inlets that is at least 30% less than the number of inlets of a conventional swimming pool with a total area per bottom inlet of 400 $ft^2$; and the reduced centralized filtration system effectively filters at least 30% less volume within a 24-hour period than a conventional swimming pool filtration system which filters the complete water volume four times within a 24-hour period;

a micro-renewal system which allows a micro-leakage of the water through a plurality of micro-leakage points located in an inner surface of the structure, wherein a total micro-leakage volume refers to the total volume of water removed from the structure through the micro-leakage points and is lower than the volume of water filtered by the reduced low-cost centralized filtration system;

a dual-frequency skimmer system, comprising:

a high-frequency reduced skimmer system ("HFSS") that periodically removes surface water from the structure, and sends such removed water into the low-cost reduced centralized filtration system;

a low-frequency skimmer system ("LFSS") that removes surface water from the structure during a high-renewal event;

wherein the HFSS and the LFSS are configured to direct removed surface water from the structure through one or more outlets, including a shared outlet;

wherein the dual-frequency skimmer system has a Skimmer Operation Rate (SOR) of at least 10, wherein the SOR is defined as a ratio of operative hours of the HFSS to the operative hours of the LFSS within a 30-day period of time, as set forth in the following equation:

$$\text{Skimmer Operation Rate}(SOR) = \frac{\text{Hours of Operation of } HFSS}{\text{Hours of Operation of } LFSS} \geq 10$$

a make-up water system that introduces a water flow into the water body that is higher than a volume of water lost through natural evaporation of the water body in addition to the water removed from the structure through the micro-renewal system, wherein the make-up water system is arranged and configured to provide a water flow given the following equation:

$$\text{Make-Up Flow} \geq \text{Evaporation Flow} + \text{Micro-Renewal Flow}.$$

2. The structure according to claim 1, wherein the structure comprises elements and configurations that provide a safe environment for swimming selected from the group comprising at least one of a sloped access into the structure, or the use of man-made sandy beach areas in the surroundings of the structure.

3. The structure according to claim 2, wherein the use of sandy beach area is contiguous to at least one sloped access into the structure.

4. The structure according to claim 1, wherein the reduced centralized filtration system further comprises:

a plurality of outlets to withdraw water from the structure; and a reduced filtration system that is configured to filter such water flow withdrawn through the plurality of outlets.

5. The structure according to claim 4, wherein the network of outlets is configured to pull out water from the water body in the structure at a rate that is less than a rate equivalent to recirculating the complete water volume four times per day.

6. The structure according to claim 1, wherein the reduced centralized filtration system is able to effectively filter at least 40% less volume within a 24-hour period, or at least 50% less volume, or at least 60% less volume, or at least 70% less volume, or at least 80% less volume, or at least 90% less volume or less compared with a filtration rate required to homogeneously filter the complete water volume four times per day.

7. The structure according to claim 1, wherein the total number of bottom inlets is at least 40%, 50%, 60%, 70%, 80% or 90% less than the number of bottom inlets of a conventional swimming pool with a total area per bottom inlet of 400 $ft^2$.

8. The structure according to claim 1, wherein the reduced filtration system comprises at least one filtration equipment and at least one pump, and is configured to filter the water flow withdrawn from the structure through the outlets.

9. The structure according to claim 1, wherein the micro-renewal system allows generating a more homogeneous and permanent renewal of water from the structure, whereby dead zones in the water body are minimized.

10. The structure according to claim 1, wherein the micro-leakage points are created by the use of netting or grated elements and a set of valves to achieve a uniform micro-leakage from the inner surface of the structure.

11. The structure according to claim 1, wherein the micro-leakage points refer to an area within the inner surface of the water body where there is a hydraulic connection between the water volume contained in the structure and the soil or filling material under the structure.

12. The structure according to claim 1, wherein the micro-leakage points transfer water from withing the structure into the soil or filling material under the structure.

13. The structure according to claim 1, wherein the micro-leakage points are positioned throughout the inner surface of the structure that is in contact with the soil or filling material under the structure.

14. The structure according to claim 1, wherein the water volume removed from the structure by the micro-renewal system is estimated to be at least 30% less, compared to the volume of water homogeneously filtered by the reduced low-cost centralized filtration system.

15. The structure according to claim 1, wherein a permeability coefficient (hydraulic conductivity) of the soil or filling material under the structure that receives the water from the micro-leakage points is at least $1\times10^{-3}$ cm/s.

16. The structure according to claim 1, wherein the permeability coefficient (hydraulic conductivity) of the soil or filling material under the structure that receives the water from the micro-leakage points is between $1\times10^{-3}$ to $1\times10^{-7}$ cm/s.

17. The structure according to claim 1, wherein the permeability coefficient (hydraulic conductivity) of the soil or filling material under the structure that receives the water from the micro-leakage points is less than $1\times10^{-7}$ cm/s.

18. The structure according to claim 1, wherein the micro-leakage points are created by the use of micro-leakage materials and systems that, given their use, installation, or placement within the inner surface of the water body, are not 100% stagnant or create crevices or openings within the inner surface to allow for micro-leakage.

19. The structure according to claim 1, wherein the micro-leakage points are created by the use of netting or grated elements and a set of valves to achieve a uniform micro-leakage from the inner surface of the structure.

20. The structure according to claim 1, wherein the micro-leakage points are created by the use of micro-leakage materials selected from the group consisting of grid materials woven geotextiles, netting materials, fabric materials, textile materials, plastic materials, thermoplastics materials, membranes and combinations thereof.

21. The structure according to claim 20, wherein the micro-leakage materials may be looped, attached, knitted, heat sealed, induction heat sealed, welded, twisted, fusion bonded, knotted, whereby intersections are present.

22. The structure according to claim 20, wherein the micro-leakage points include joints, crevices, welding points, or punctures.

23. The structure according to claim 1, wherein a micro-leakage water flow is 0.1 to 0.5 liters per second per hectare of inner surface of the structure exposed to the water volume.

24. The structure according to claim 1, wherein the micro-leakage points are periodically cleaned with a cleaning device, so that the micro-leakage points do not become clogged or obstructed in a way that would hinder them from creating a micro-leakage water flow.

25. The structure according to claim 1, wherein the micro-leakage points are periodically cleaned either manually or through automatic means using brushing systems or vacuum-based devices that are arranged to suction sediments and particles from the micro-leakage points.

26. The structure according to claim 1, wherein the HFSS is configured to withdraw at least 30% less volume of water within a 24-hr period of time compared to a conventional swimming pool system skimmer system.

27. The structure according to claim 1, wherein the LFSS is not hydraulically connected to the reduced centralized filtration system.

28. The structure according to claim 1, wherein the LFSS is selected from a perimeter weir system, an overflow structure, a perimeter opening structure located in at least one portion of the perimeter of the structure or combinations thereof.

29. The structure according to claim 1, wherein the HFSS and the LFSS are configured to direct removed surface water from the structure through a shared outlet.

30. The structure according to claim 1, wherein a minimum freeboard volume is required in the structure, such that the minimum freeboard distance between the top surface of the water body and a top most point of the containment structure is at least 5 cm.

31. The structure according to claim 1, wherein the water removed through the LFSS is disposed of.

32. The structure according to claim 1, wherein the water removed through the LFSS is used for irrigation purposes, infiltration purposes, or use of such water for filtration and treatment prior to being used for recreational purposes.

33. The structure according to claim 1, wherein the LFSS is designed to remove water from the water body based on precipitation data and rainfall IDF curves (intensity, duration, frequency curves) for the specific location where the structure is located, and characteristics of the soil or filling material under the structure.

34. The structure according to claim 1, wherein the LFSS is generally designed to be able to remove a water flow from the structure.

35. The structure according to claim 1, wherein the LFSS includes a weir structure on a length that is wide enough to allow the removal of water at a rate that allows avoiding overfilling the structure with water.

36. The structure according to claim 1, wherein the LFSS comprises at least one weir structure which removes water from the structure.

37. The structure according to claim 36, wherein the weir structure comprises at least two openings for safety and discharge purposes.

38. The structure according to claim 1, wherein in the event that the number of hours of operation of the LFSS is 0 during a 30-day period of time, then the hours of operation of the HFSS are at least 180.

* * * * *